(12) United States Patent
Ono et al.

(10) Patent No.: US 10,519,369 B2
(45) Date of Patent: Dec. 31, 2019

(54) CORE SHELL PARTICLES, METHOD FOR PRODUCING CORE SHELL PARTICLES, AND FILM

(71) Applicant: FUJIFILM Corporation, Tokyo (JP)

(72) Inventors: Masashi Ono, Kanagawa (JP); Tsutomu Sasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/409,881

(22) Filed: May 13, 2019

(65) Prior Publication Data

US 2019/0264103 A1 Aug. 29, 2019

Related U.S. Application Data

(63) Continuation of application No. PCT/JP2017/040109, filed on Nov. 7, 2017.

(30) Foreign Application Priority Data

Nov. 15, 2016 (JP) .................................. 2016-222142

(51) Int. Cl.
C09K 11/70 (2006.01)
C01B 25/08 (2006.01)

(52) U.S. Cl.
CPC .............. C09K 11/70 (2013.01); C01B 25/08 (2013.01)

(58) Field of Classification Search
CPC ................................ C09K 11/70; C01B 25/08
See application file for complete search history.

(56) References Cited

U.S. PATENT DOCUMENTS

| | | |
|---|---|---|
| 2009/0053522 A1 | 2/2009 | Sekiguchi et al. |
| 2009/0230382 A1 | 9/2009 | Banin et al. |
| 2009/0264668 A1 | 10/2009 | Tokumitsu |
| 2009/0315446 A1 | 12/2009 | Murase et al. |
| 2010/0163798 A1 | 7/2010 | Ryowa et al. |
| 2011/0212561 A1 | 9/2011 | Banin et al. |
| 2014/0084212 A1 | 3/2014 | Kikuchi |
| 2017/0247614 A1* | 8/2017 | Li .................... C09K 11/883 |

FOREIGN PATENT DOCUMENTS

| | | |
|---|---|---|
| JP | 2010155872 | 7/2010 |
| JP | 2010270139 | 12/2010 |
| JP | 5137825 | 2/2013 |
| JP | 2013136498 | 7/2013 |
| JP | 2015096461 | 5/2015 |
| WO | 2007086188 | 8/2007 |
| WO | 2012165117 | 12/2012 |
| WO | WO 2016/086511 | * 6/2016 |

OTHER PUBLICATIONS

"International Preliminary Report on Patentability (Form PCT/IPEA/409) of PCT/JP2017/040109," dated Oct. 15, 2018, with English translation thereof, pp. 1-6.
"International Search Report (Form PCT/ISA/210) of PCT/JP2017/040109," dated Dec. 19, 2017, with English translation thereof, pp. 1-4.
Sungwoo Kim et al., "Highly Luminescent InP/GaP/ZnS Nanocrystals and Their Application to White Light-Emitting Diodes," J. Am. Chem. Soc., vol. 134, No. 8, Feb. 2012, pp. 3804-3809.
Héloïse Virieux et al., "InP/ZnS Nanocrystals: Coupling NMR and XPS for Fine Surface and Interface Description," J. Am. Chem. Soc., vol. 134, No. 48, Nov. 2012, pp. 19701-19708.
Kyungnam Kim et al., "Highly luminescing multi-shell semiconductor nanocrystals InP/ZnSe/ZnS," Applied Physics Letters, vol. 101, Aug. 14, 2012, p. 073107-1-p. 073107-4.
Assaf Aharoni et al., "Synthesis of InAs/CdSe/ZnSe Core/Shell1/Shell2 Structures with Bright and Stable Near-Infrared Fluorescence," J. Am. Chem. Soc., vol. 128, No. 1, 2006, pp. 257-264.
Office Action of Japan Counterpart Application, with English translation thereof, dated Jul. 9, 2019, pp. 1-6.

\* cited by examiner

*Primary Examiner* — C Melissa Koslow
(74) *Attorney, Agent, or Firm* — JCIPRNET

(57) ABSTRACT

An object of the present invention is to provide a core shell particle having high luminous efficacy and a narrow emission half-width; a method of producing the same; and a film formed of the core shell particle. The core shell particle of the present invention includes: a core which contains a Group III element and a Group V element; a first shell which covers at least a part of a surface of the core; a second shell which covers at least a part of the first shell; and a coordination molecule in at least a part of an outermost surface, in which at least silicon is detected by X-ray photoelectron spectroscopy analysis, and a molar ratio of the silicon to the Group III element contained in the core, which is acquired by X-ray photoelectron spectroscopy analysis, is 3.1 or less.

23 Claims, No Drawings

US 10,519,369 B2

CORE SHELL PARTICLES, METHOD FOR PRODUCING CORE SHELL PARTICLES, AND FILM

CROSS-REFERENCE TO RELATED APPLICATIONS

This application is a Continuation of PCT International Application No. PCT/JP2017/040109 filed on Nov. 7, 2017, which claims priority under 35 U.S.C. § 119(a) to Japanese Patent Application No. 2016-222142 filed on Nov. 15, 2016. The above application is hereby expressly incorporated by reference, in its entirety, into the present application.

BACKGROUND OF THE INVENTION

1. Field of the Invention

The present invention relates to a core shell particle, a method of producing the same, and a film containing a core shell particle.

2. Description of the Related Art

As semiconductor fine particles which are expected to be applied to colloidal semiconductor nanoparticles (so-called quantum dots), Group II-VI semiconductor fine particles or Group III-V semiconductor fine particles have been known.

The particle diameter of these semiconductor fine particles is several nanometers to several tens of nanometers.

Further, a band gap typically becomes larger as the particle diameter of particles having such a nanoscale decrease due to so-called quantum size effects, and the emission characteristics in a wide wavelength band from a near infrared range to a visible light range can be controlled by controlling the particle size thereof.

Therefore, in order to use optical characteristics specific to the semiconductor fine particles, applications to various devices such as a photoelectric conversion element, an electronic device, a light-emitting element, and a laser have been researched and developed.

After suggestion of a hot soap method (also referred to as a hot injection method) which is a chemical synthesis method of quantum dots in "Highly Luminescent InP/GaP/ZnS Nanocrystals and Their Application to White Light-Emitting Diodes", Journal of the American Chemical Society 134, written by S. Kim et al., 3804-3809 (2012), the research on quantum dots has been actively performed around the world.

Further, the examination of the quantum dots was performed mainly on a Group II-VI semiconductor containing a Cd element or a Pb element at the time of initial research, but the research on quantum dots which do not contain Cd or Pb has been recently suggested since the Cd element and the Pb element are substances regulated as Restriction on Hazardous Substances (Rohs) or the like (for example, JP5137825B).

SUMMARY OF THE INVENTION

The present inventors performed examination on core shell particles having multilayers of shell layers described in JP5137825B and "Highly Luminescent InP/GaP/ZnS Nanocrystals and Their Application to White Light-Emitting Diodes", Journal of the American Chemical Society 134, written by S. Kim et al., 3804-3809 (2012), and it was found that synthesis conditions (for example, the reaction atmosphere, the reaction temperature, and the reaction time) have not been established, and the luminous efficacy or the emission half-width significantly fluctuates depending on the synthesis conditions.

Accordingly, an object of the present invention is to provide a core shell particle having high luminous efficacy and a narrow emission half-width, a method of producing the same, and a film formed of the core shell particle.

As a result of intensive examination conducted by the present inventors in order to achieve the above-described object, it was found that, in a core shell particle including: a core which contains a Group III element and a Group V element; a first shell which covers at least a part of a surface of the core; a second shell which covers at least a part of the first shell; and a coordination molecule in at least a part of an outermost surface, the luminous efficacy is excellent and the emission half-width becomes narrow in a case where at least silicon is detected by X-ray photoelectron spectroscopy analysis, and a molar ratio of the silicon to the Group III element contained in the core, which is acquired by X-ray photoelectron spectroscopy analysis, is 3.1 or less, thereby completing the present invention.

In other words, it was found that the above-described object can be achieved by the following configurations.

[1] A core shell particle comprising: a core which contains a Group III element and a Group V element; a first shell which covers at least a part of a surface of the core; a second shell which covers at least a part of the first shell; and a coordination molecule in at least a part of an outermost surface, in which at least silicon is detected by X-ray photoelectron spectroscopy analysis, and a molar ratio of the silicon to the Group III element contained in the core, which is acquired by X-ray photoelectron spectroscopy analysis, is 3.1 or less.

[2] The core shell particle according to [1], in which the molar ratio of the silicon to the Group III element contained in the core, which is acquired by X-ray photoelectron spectroscopy analysis, is 1.6 or less.

[3] The core shell particle according to [1], in which the molar ratio of the silicon to the Group III element contained in the core, which is acquired by X-ray photoelectron spectroscopy analysis, is 1.2 or less.

[4] The core shell particle according to any one of [1] to [3], in which the Group III element contained in the core is In, and the Group V element contained in the core is any of P, N, or As.

[5] The core shell particle according to [4], in which the Group III element contained in the core is In, and the Group V element contained in the core is P.

[6] The core shell particle according to any one of [1] to [5], in which the core further contains a Group II element.

[7] The core shell particle according to [6], in which the Group II element contained in the core is Zn.

[8] The core shell particle according to any one of [1] to [7], in which the first shell contains a Group II element or a Group III element, wherein, in a case where the first shell contains the Group III element, the Group III element contained in the first shell is a Group III element which is different from the Group III element contained in the core.

[9] The core shell particle according to any one of [1] to [8], in which the first shell is a Group II-VI semiconductor which contains a Group II element and a Group VI element or a Group III-V semiconductor which contains a Group III element and a Group V element, wherein, in a case where the first shell is the Group III-V semiconductor, the Group III element contained in the Group III-V semiconductor is a Group III element which is different from the Group III element contained in the core.

[10] The core shell particle according to [9], in which, in a case where the first shell is the Group II-VI semiconductor, the Group II element is Zn and the Group VI element is Se or S, and in a case where the first shell is the Group III-V semiconductor, the Group III element is Ga and the Group V element is P.

[11] The core shell particle according to [9], in which the first shell is the Group III-V semiconductor, the Group III element is Ga, and the Group V element is P.

[12] The core shell particle according to any one of [1] to [11], in which the second shell is a Group II-VI semiconductor which contains a Group II element and a Group VI element or a Group III-V semiconductor which contains a Group III element and a Group V element.

[13] The core shell particle according to [12], in which the second shell is the Group II-VI semiconductor, the Group II element is Zn, and the Group VI element is S.

[14] The core shell particle according to any one of [1] to [13], in which the core, the first shell, and the second shell each have a crystal system having a zinc blende structure.

[15] The core shell particle according to any one of [1] to [14], in which, among the core, the first shell, and the second shell, a band gap of the core is the smallest, and the core and the first shell respectively have a type 1 band structure.

[16] A method of producing a core shell particle for synthesizing the core shell particle according to any one of [1] to [15], the method comprising: a first step of heating and stirring a solution obtained by adding a Group III raw material which contains a Group III element to a solvent containing coordination molecules; a second step of forming a core by adding a solution to which a Group V raw material containing a Group V element and silicon has been added to the solution after the first step; a third step of growing the core in the solution after the second step; a fourth step of forming a first shell by adding a raw material of the first shell to the solution after the third step; and a fifth step of forming a second shell by adding a raw material of the second shell to the solution after the fourth step and synthesizing a core shell particle, in which the second step is performed in an argon gas atmosphere, the third step, the fourth step, and the fifth step are performed in an inert gas atmosphere, and the third step is a step of holding the state at a temperature of 150° C. or higher for 30 minutes or longer.

[17] A method of producing a core shell particle for synthesizing the core shell particle according to any one of [1] to [15], the method comprising: a first step of heating and stirring a solution obtained by adding a Group III raw material which contains a Group III element to a solvent containing coordination molecules; a second step of forming a core by adding a solution to which a Group V raw material containing a Group V element and silicon has been added to the solution after the first step; a third step of growing the core in the solution after the second step; a fourth step of forming a first shell by adding a raw material of the first shell to the solution after the third step; and a fifth step of forming a second shell by adding a raw material of the second shell to the solution after the fourth step and synthesizing a core shell particle, in which each of the second step to the fifth step is performed in an inert gas atmosphere, and the third step is a step of holding the state at a temperature of 200° C. or higher for longer than 2 hours.

[18] The method of producing a core shell particle according to [17], in which the holding time in the third step is 150 minutes or longer.

[19] The method of producing a core shell particle according to [17], in which the holding time in the third step is 165 minutes or longer.

[20] The method of producing a core shell particle according to any one of [17] to [19], in which the holding time in the third step is 300 minutes or shorter.

[21] The method of producing a core shell particle according to any one of [17] to [20], in which the holding temperature in the third step is 250° C. or higher.

[22] The method of producing a core shell particle according to any one of [17] to [21], in which the holding temperature in the third step is 290° C. or lower.

[23] A film comprising: the core shell particle according to any one of [1] to [15].

According to the present invention, it is possible to provide a core shell particle having high luminous efficacy and a narrow emission half-width, a method of producing the same, and a film formed of the core shell particle.

DESCRIPTION OF THE PREFERRED EMBODIMENTS

Hereinafter, the present invention will be described in detail.

The description of constituent elements below will be occasionally made based on representative embodiments of the present invention, but the present invention is not limited to these embodiments.

In the present specification, the numerical ranges expressed using "to" indicate the ranges including the numerical values described before and after "to" as the lower limits and the upper limits.

[Core Shell Particle]

A core shell particle according to the embodiment of the present invention includes a core which contains a Group III element and a Group V element, a first shell which covers at least a part of a surface of the core, a second shell which covers at least a part of the first shell, and a coordination molecule in at least a part of an outermost surface.

Further, in the core shell particle according to the embodiment of the present invention, at least silicon is detected by X-ray photoelectron spectroscopy (hereinafter, also referred to as "XPS") analysis, and the molar ratio of the silicon to the Group III element (hereinafter, referred to as the "molar ratio (silicon/Group III element)") contained in the core, which is acquired by XPS analysis, is 3.1 or less.

Here, the above-described molar ratio is acquired in the following manner.

In other words, the molar ratio is acquired by performing measurement on the core shell particles according to XPS and correcting the ratio of the peak intensity of the Group III element contained in the core to the peak intensity of silicon elements contained in the entirety of the core shell particles with a relative sensitivity coefficient for each element. The relative sensitivity coefficient is acquired by measuring measurement elements (measurement trajectory) described below related to standard samples whose compositions have been known (Journal of Surface Analysis, Vol. 12, No. 3, pp. 357 (2005)).

Further, the peak intensity indicates the area intensity obtained by subtracting the background from the peak observed under the following measurement conditions and integrating the area of the peak with respect to the energy.

Further, the XPS measurement is performed by using a sample obtained by adding dropwise a dispersion liquid (solvent: toluene) containing core shell particles on a non-doped silicon substrate in a glove box and drying the dispersion liquid.

<Measurement Conditions>

Measuring device: Quantera SXM type XPS (manufactured by ULVAC-PHI, Inc.)

X-ray source: Al-Kα ray (analytic diameter: 100 μm, 25 W, 15 kV)

Extraction angle of photoelectrons: 45°

Measurement range: 300 μm×300 μm

Correction: charging correction using combination of electron gun and low-speed ion gun Measurement elements (measurement trajectory): C (1s), N (1s), O (1s), Si (2p), P (2p), S (2p), Cl (2p), Zn (2p3/2), Ga (2p3/2), In (3d5/2)

In the core shell particle according to the embodiment of the present invention, the luminous efficacy is increased and the emission half-width is narrowed in a case where the molar ratio (silicon/Group III element) acquired by X-ray photoelectron spectroscopy analysis is 3.1 or less.

The detailed reason why the luminous efficacy is increased and the emission half-width is narrowed is not clear, but is speculated as follows.

First, the degradation of the emission half-width is assumed to be caused due to decomposition of raw materials, side reactions, and a state in which silicon remaining in the raw materials is taken into the core during the production. Specifically, in a case where tetravalent silicon is mixed into the core, it is considered that a crystal structure of the core containing the Group III element and the Group V element is in disorder by maintaining charge neutrality. Therefore, it is considered that disorder of the crystal structure causes unevenness of the effective particle diameter of the core particle and leads to degradation of the emission half-width.

In addition, degradation of the luminous efficacy is assumed to be caused by defects (defects at the interface between the core and the shell) in the surface of each core particle or defects of the surface of the shell. Specifically, in defect sites of the surface of the core particle and the surface of the shell, the luminous efficacy is considered to be degraded due to occurrence of non-radiative recombination or a local increase in lattice mismatch.

Therefore, in the present invention, by setting the molar ratio (silicon/Group III element) to 3.1 or less, disorder of the crystal structure of the core is suppressed so that the effective particle diameter of the core is made uniform, and thus a shell which is uniform and does not have any defect can be formed. Therefore, it is considered that the luminous efficacy is increased and the emission half-width is narrowed.

In the present invention, from the viewpoint that the luminous efficacy is further increased and the emission half-width is further narrowed, the molar ratio (silicon/Group III element) is preferably 3.0 or less. From the viewpoint that the emission half-width is particularly narrowed, the molar ratio is more preferably 1.6 or less and more preferably 1.2 or less.

In the present invention, from the viewpoint that the emission half-width is further narrowed, the proportion (hereinafter, also referred to as an "silicon content ratio") of silicon elements with respect to the following measurement elements measured by the XPS analysis under the above-described conditions is preferably 4% or less, more preferably 2% or less, and still more preferably 1.5% or less.

Here, the silicon content ratio is acquired by correcting the ratio of the peak intensity of silicon elements to a total peak intensity of the following measurement elements contained in the entirety of the core shell particles with a relative sensitivity coefficient for each element.

Measurement elements (measurement trajectory): C (1s), N (1s), O (1s), Si (2p), P (2p), S (2p), Cl (2p), Zn (2p3/2), Ga (2p3/2), In (3d5/2)

[Core]

The core contained in the core shell particle according to the embodiment of the present invention is a so-called Group III-V semiconductor that contains a Group III element and a Group V element.

<Group III Element>

Specific examples of the Group III element include indium (In), aluminum (Al), and gallium (Ga). Among these, In is preferable.

<Group V Element>

Specific examples of the Group V element include phosphorus (P), nitrogen (N), and arsenic (As). Among these, P is preferable.

In the present invention, a Group III-V semiconductor obtained by appropriately combining the Group III element and the Group V element exemplified above can be used as the core, but InP, InN, or InAs is preferable from the viewpoint that the luminous efficacy is further increased, the emission half-width is narrowed, and a clear exciton peak is obtained. Among these, from the viewpoint of further increasing the luminous efficacy, InP is more preferable.

In the present invention, it is preferable that the core further contains a Group II element in addition to the Group III element and the Group V element described above. Particularly in a case where the core is InP, the lattice constant is decreased by doping Zn as the Group II element and the lattice matching performance with a shell (for example, GaP, ZnS, or the like described below) having a smaller lattice constant than that of InP becomes excellent.

[First Shell]

The first shell contained in the core shell particle according to the embodiment of the present invention is a material that covers at least a part of the surface of the core.

Here, in the present invention, it is possible to confirm whether at least a part of the surface of the core is covered with the first shell based on composition distribution analysis according to energy dispersive X-ray spectroscopy (TEM-EDX) using a transmission electron microscope.

In the present invention, from the viewpoint of easily suppressing defects of the interface between the core and the first shell, it is preferable that the first shell contains a Group II element or a Group III element.

Here, in a case where the first shell contains a Group III element, the Group III element contained in the first shell is a Group III element which is different from the Group III element contained in the core described above.

Further, in addition to a Group II-VI semiconductor and a Group III-V semiconductor described below, a Group III-VI semiconductor (such as $Ga_2O_3$ or $Ga_2S_3$) containing a Group III element and a Group VI element is exemplified as the first shell containing a Group II element or a Group III element.

In the present invention, from the viewpoint of obtaining an excellent crystal phase with less defects, it is preferable that the first shell is a Group II-VI semiconductor containing a Group II element and a Group VI element or a Group III-V semiconductor containing a Group III element and a Group V element and more preferable that the first shell is a Group III-V semiconductor in which a difference in lattice constant between the core described above and the first shell is small.

Here, in a case where the first shell is a Group III-V semiconductor, the Group III element contained in the Group III-V semiconductor is a group III element which is different from the Group III element contained in the core described above.

<Group II-VI Semiconductor>

Specific examples of the Group II element contained in the Group II-VI semiconductor include zinc (Zn), cadmium (Cd), and magnesium (Mg). Among these, Zn is preferable.

Further, specific examples of the Group VI element contained in the Group II-VI semiconductor include sulfur (S), oxygen (O), selenium (Se), and tellurium (Te). Among these, S or Se is preferable and S is more preferable.

A Group II-VI semiconductor obtained by appropriately combining the Group II element and the Group VI element described above can be used as the first shell, but it is preferable that the first shell has a crystal system (for example, a zinc blende structure) which is the same as or similar to the core described above. Specifically, ZnSe, ZnS, or a mixed crystal of these is preferable and ZnSe is more preferable.

<Group III-V Semiconductor>

Specific examples of the Group III element contained in the Group III-V semiconductor include indium (In), aluminum (Al), and gallium (Ga). Among these, Ga is preferable. Further, as described above, the Group III element contained in the Group III-V semiconductor is a Group III element which is different from the Group III element contained in the core described above. For example, in a case where the Group III element contained in the core is In, the Group III element contained in the Group III-V semiconductor is Al, Ga, or the like.

Further, specific examples of the Group V element contained in the Group III-V semiconductor include phosphorus (P), nitrogen (N), and arsenic (As). Among these, P is preferable.

A Group III-V semiconductor obtained by appropriately combining the Group III element and the Group V element described above can be used as the first shell, but it is preferable that the first shell has a crystal system (for example, a zinc blende structure) which is the same as or similar to the core described above. Specifically, GaP is preferable.

In the present invention, from the viewpoint of reducing defects of the surface of the core shell particle to be obtained, it is preferable that a difference in lattice constant between the above-described core and the first shell is small. Specifically, the difference in lattice constant between the above-described core and the first shell is preferably 10% or less and more preferably 7.5% or less.

Specifically, in a case where the above-described core is InP, it is preferable that the first shell is ZnSe (difference in lattice constant: 3.4%) or GaP (difference in lattice constant: 7.1%) as described above. Particularly, it is more preferable that the first shell is the same Group III-V semiconductor as the core and is GaP from the viewpoint that a mixed crystal state can be easily made on the interface between the core and the first shell.

In the present invention, in a case where the first shell is a Group III-V semiconductor, the first shell may contain or dope another element (for example, the Group II element or the Group VI element described above) within the range that does not affect the magnitude correlation (core<first shell) of the band gap between the core and the first shell. Similarly, in a case where the first shell is a Group II-VI semiconductor, the first shell may contain or dope another element (for example, the Group III element or the Group V element described above) within the range that does not affect the magnitude correlation (core<first shell) of the band gap between the core and the first shell.

[Second Shell]

The second shell contained in the core shell particle according to the embodiment of the present invention is a material that covers at least a part of the surface of the first shell described above.

Here, in the present invention, it is possible to confirm whether at least a part of the surface of the first shell is covered with the second shell based on composition distribution analysis according to energy dispersive X-ray spectroscopy (TEM-EDX) using a transmission electron microscope.

In the present invention, from the viewpoints of suppressing defects of the interface between the first shell and the second shell and obtaining an excellent crystal phase with less defects, it is preferable that the second shell is a Group II-VI semiconductor containing a Group II element and a Group VI element or a Group III-V semiconductor containing a Group III element and a Group V element. Further, from the viewpoints of high reactivity of the material itself and easily obtaining a shell with excellent crystallinity, it is more preferable that the second shell is a Group II-VI semiconductor.

Examples of the Group II element, the Group VI element, the Group III element, and the Group V element include those described in the section of the first shell.

A Group II-VI semiconductor obtained by appropriately combining the Group II element and the Group VI element described above can be used as the second shell, but it is preferable that the second shell has a crystal system (for example, a zinc blende structure) which is the same as or similar to the core described above. Specifically, ZnSe, ZnS, or a mixed crystal of these is preferable and ZnS is more preferable.

A Group III-V semiconductor obtained by appropriately combining the Group III element and the Group V element described above can be used as the second shell, but it is preferable that the second shell has a crystal system (for example, a zinc blende structure) which is the same as or similar to the core described above. Specifically, GaP is preferable.

In the present invention, from the viewpoint of reducing defects of the surface of the core shell particle to be obtained, it is preferable that a difference in lattice constant between the above-described first shell and the second shell is small. Specifically, it is preferable that the difference in lattice constant between the above-described first shell and the second shell is 10% or less. Further, from the viewpoint of further reducing lattice mismatch so that the luminous efficacy is likely to be increased, the lattice mismatch is desirably 4% or less and more desirably 2% or less.

Specifically, in a case where the above-described first shell is GaP, it is preferable that the second shell is ZnSe (difference in lattice constant: 3.8%) or ZnS (difference in lattice constant: 0.8%) as described above and more preferable that the second shell is ZnS.

In the present invention, in a case where the second shell is a Group II-VI semiconductor, the second shell may contain or dope another element (for example, the Group III element or the Group V element described above) within the range that does not affect the magnitude correlation (core<second shell) of the band gap between the core and the second shell. Similarly, in a case where the second shell is a Group III-V semiconductor, the second shell may contain or dope another element (for example, the Group II element or the Group VI element described above) within the range that does not affect the magnitude correlation (core<second shell) of the band gap between the core and the second shell.

In the present invention, from the viewpoint that epitaxial growth becomes easy and defects of an interface between layers are easily suppressed, it is preferable that each of the core, the first shell, and the second shell described above has a crystal system having a zinc blende structure.

In the present invention, from the viewpoint that the probability of excitons remaining in the core becomes higher and the luminous efficacy is further increased, it is preferable that the band gap of the core from among the core, the first shell, and the second shell described above is the smallest and the core and the first shell are core shell particles having a type 1 (type I) band structure.

[Coordination Molecule]

From the viewpoint of imparting dispersibility, it is desirable that the outermost surface of the core shell particle according to the embodiment of the present invention has coordination molecules.

From the viewpoint of the dispersibility or the like in a solvent, it is preferable that the coordination molecule contains aliphatic hydrocarbon.

Further, from the viewpoint of improving the dispersibility, it is preferable that the coordination molecule is a ligand having at least 6 carbon atoms in the main chain and more preferable that the coordination molecule is a ligand having 10 or more carbon atoms in the main chain.

Such a coordination molecule is a saturated compound or an unsaturated compound, and specific examples thereof include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide. These may be used alone or in combination of two or more kinds thereof.

[Average Particle Diameter]

From the viewpoints of easily synthesizing particles having a uniform size and easily controlling the emission wavelength using quantum size effects, the average particle diameter of the core shell particles according to the embodiment of the present invention is preferably 2 nm or greater. Further, from the viewpoint of holding high dispersibility in a solution, the average particle diameter thereof is more preferably 10 nm or less.

Here, the average particle diameter is a value obtained by directly observing at least 20 particles using a transmission electron microscope, calculating the diameters of circles having the same area as the projected area of the particles, and arithmetically averaging these values.

[First Method of Producing Core Shell Particles]

A first method of producing a core shell particle for synthesizing the core shell particle according to the embodiment of the present invention described above (hereinafter, also referred to as the "first production method of the present invention") includes a first step of heating and stirring a solution obtained by adding a Group III raw material which contains a Group III element to a solvent containing coordination molecules; a second step of forming a core by adding a solution to which a Group V raw material containing a Group V element and silicon has been added to the solution after the first step; a third step of growing the core in the solution after the second step; a fourth step of forming a first shell by adding a raw material of the first shell to the solution after the third step; and a fifth step of forming a second shell by adding a raw material of the second shell to the solution after the fourth step and synthesizing a core shell particle, in which the second step is performed in an argon gas atmosphere, the third step, the fourth step, and the fifth step are performed in an inert gas atmosphere, and the third step is a step of holding the state at a temperature of 150° C. or higher for 30 minutes or longer.

Here, examples of the Group III element and the Group V element are the same as those described in the section of the core shell particle according to the embodiment of the present invention described above.

Hereinafter, raw materials and conditions of each treatment step will be described in detail.

[First Step]

The first step included in the first production method of the present invention is a step of heating and stirring a solution obtained by adding a Group III raw material which contains a Group III element to a solvent containing coordination molecules.

<Coordination Molecule>

Examples of the coordination molecule used in the first step are the same as those described in the section of the core shell particle according to the embodiment of the present invention described above. Among those, from the viewpoints of promoting the synthesis of the core and having an appropriate coordination force with respect to the core, oleic acid, palmitic acid, and stearic acid are preferable.

<Solvent>

Preferred examples of the solvent used in the first step include non-polar solvents having a boiling point of 170° C. or higher.

Examples of the non-polar solvents include aliphatic saturated hydrocarbon such as n-decane, n-dodecane, n-hexanedecane, or n-octadecane; aliphatic unsaturated hydrocarbon such as 1-undecene, 1-dodecene, 1-hexadecene, or 1-octadecene; and trioctylphosphine.

Among these, aliphatic unsaturated hydrocarbon having 12 or greater carbon atoms is preferable and 1-octadecene is more preferable.

<Group III Raw Material>

Specific examples of the Group III raw material to be added to the solvent containing the coordination molecule described above include indium acetate, indium chloride, indium oxide, indium nitrate, indium sulfate, and indium acid; aluminum phosphate, aluminum acetylacetonate, aluminum chloride, aluminum fluoride, aluminum oxide, aluminum nitrate, and aluminum sulfate; and gallium acetylacetonate, gallium chloride, gallium fluoride, gallium oxide, gallium nitrate, and gallium sulfate.

Among these, from the viewpoints of further improving the luminous efficacy and easily controlling the emission wavelength in a visible range, a compound containing In is preferable. Particularly, from the viewpoint that impurity ions such as a chloride are unlikely to be taken into the core and excellent crystallinity is easily realized, it is more preferable to use indium acetate.

Further, the Group III raw material containing a Group III element may be used in plural kinds or may separately contain a metal compound.

<Group II Raw Material>

In the production method according to the embodiment of the present invention, a Group II raw material containing a Group II element may be added together with the Group III raw material described above during the first step.

Specific examples of the Group II raw material including a Group II element include dimethyl zinc, diethyl zinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc acetate, and zinc sulfate.

Among these, from the viewpoints that impurities such as a chloride are not contained and the compatibility with the coordination molecule described above and the solubility in a solvent are relatively high, it is preferable to use zinc acetate, which is an acetate of Zn.

<Conditions for Heating and Stirring Solution>

In the first step, it is preferable that the coordination molecules and the Group III raw material described above are dissolved in the solvent described above and also preferable that the coordination molecules and the Group III raw material are dissolved in the solvent by heating and stirring the solution in a temperature range of 100° C. to 180° C. At this time, it is preferable that dissolved oxygen or moisture is removed from the mixed solution, in which the coordination molecules and the Group III raw material have been dissolved, by heating the solution under reduced pressure.

Further, the time required for heating and dissolving is preferably 30 minutes or longer.

In the first production method of the present invention, from the viewpoints of easily forming a uniform core in the second step described below and improving the crystallinity of the formed core, it is preferable that the first step is carried out by increasing the temperature to a range of 230° C. to 310° C. after the solution is heated and stirred.

Further, in order to reduce the influence of oxygen dissolved in the solution at the start of the second step described below, it is preferable that the step of increasing the temperature after the solution is heated and stirred is performed in an argon gas atmosphere. Further, the purity of the argon gas is preferably 99.999% by volume or greater.

[Second Step]

The second step included in the first production method of the present invention is a step of forming a core by adding a solution to which a Group V raw material containing a Group V element and silicon has been added to the solution after the first step in an argon gas atmosphere.

<Group V Raw Material>

As a Group V raw material containing a Group V element and silicon (Si), for example, a raw material containing phosphorus (P) as the Group V element is preferable, and specific examples thereof include compounds containing P and Si, such as alkylsilylphosphine, alkylsilylphosphine oxide, allylsilylphosphine, and allylsilylphosphine oxide.

Among these, alkylsilylphosphine is preferable from the viewpoint of further improving the reactivity with a Group III raw material.

Examples of alkylsilylphosphine include tristrialkylsilylphosphine and trisdialkylsilylphosphine, and specific preferred examples thereof include tristrimethylsilylphosphine.

Further, the Group V raw material containing a Group V element and silicon may be used in plural kinds or may separately contain a metal compound.

<Group II Raw Material>

According to the production method according to the embodiment of the present invention, a Group II raw material containing a Group II element may be added together with the above-described Group V raw material in the second step.

Specific examples of the Group II raw material containing a Group II element are the same as those described as the optional raw materials of the first step above.

[Third Step]

The third step included in the first production method of the present invention is a step of growing the core in the solution after the second step in an inert gas atmosphere and holding the state at a temperature of 150° C. or higher for 30 minutes or longer. Here, examples of the inert gas include argon gas and nitrogen gas.

<Conditions for Growing Core>

The holding temperature in the third step is 150° C. or higher as described above, but is preferably 200° C. or higher from the viewpoints of improving the crystallinity of the particles and further reducing impurities. Further, since new nucleation of particles, excessive growth of particles, Ostwald ripening, and the like are suppressed so that the uniformity of the particle size is improved, the holding temperature is preferably 290° C. or lower and more preferably lower than 290° C.

Further, the holding time in the third step is 30 minutes or longer as described above, but is preferably 60 minutes or longer, more preferably 120 minutes or longer, and still more preferably 150 minutes or longer from the viewpoints of improving the crystallinity of the particles and further reducing impurities. Further, since new nucleation of particles, excessive growth of particles, Ostwald ripening, and the like are suppressed so that the uniformity of the particle size is improved, the holding time is preferably 300 minutes or shorter and more preferably shorter than 300 minutes.

[Fourth Step]

The fourth step included in the first production method of the present invention is a step of forming a first shell by adding a raw material of the first shell to the solution after the third step in an inert gas atmosphere.

Here, examples of the inert gas include argon gas and nitrogen gas.

Further, as the raw material of the first shell, a Group II raw material containing the Group II element described above and a Group VI raw material containing the Group VI element described below are exemplified in a case where the first shell is the Group II-VI semiconductor described above; and a Group III raw material containing the Group III element described above and a Group V raw material containing the Group V element described above are exemplified in a case where the first shell is the Group III-V semiconductor described above.

Here, in a case where the first shell is the above-described Group III-V semiconductor, as described in the section of the core shell particle according to the embodiment of the present invention, the Group III element contained in the Group III-V semiconductor is a Group III element which is different from the Group III element contained in the core described above.

Further, in a case where the first shell is the Group III-V semiconductor described above, since the Group V raw material containing a Group V element is the same raw material as the Group V raw material forming the core, a part of the Group V raw material used in the second step may be used and only the Group III raw material may be added in the fourth step.

<Group VI Raw Material>

Specific examples of the Group VI raw material containing a Group VI element include sulfur, alkylthiol, trialkylphosphine sulfide, trialkenylphosphine sulfide, alkylamino sulfide, alkenylamino sulfide, cyclohexyl isothiocyanate, dialkyl dithiocarbamic acid, and diethyl dithiocarbamic acid; and trialkylphosphine selenium, trialkenylphosphine selenium, alkylamino selenium, alkenylamino selenium, trialkylphosphine telluride, trialkenylphosphine telluride, alkylamino telluride, and alkenylamino telluride.

Among these, from the viewpoint of excellent dispersibility of core shell particles to be obtained, it is preferable to use alkylthiol, specifically, more preferable to use dodecanethiol or octanethiol, and still more preferable to use dodecanethiol.

Among these materials, it is preferable to use the Group III raw material and the Group V raw material.

Particularly, as the Group III raw material, it is more preferable to use a compound containing Ga (such as gallium acetylacetonate, gallium chloride, gallium fluoride, gallium oxide, gallium nitrate, or gallium sulfate) and still more preferable to use a chloride of Ga.

In addition, as the Group V raw material, it is preferable to use a part of the Group V raw material used in the second step as described above.

[Fifth Step]

The fifth step included in the first production method of the present invention is a step of synthesizing a core shell particle by adding a raw material of a second shell to the solution after the fourth step in an inert gas atmosphere to form the second shell.

Further, examples of the inert gas include argon gas and nitrogen gas.

Here, as the raw material of the second shell, a Group II raw material containing the Group II element described above and a Group VI raw material containing the Group VI element described above are exemplified in a case where the second shell is the Group II-VI semiconductor described above; and a Group III raw material containing the Group III element described above and a Group V raw material containing the Group V element described above are exemplified in a case where the second shell is the Group III-V semiconductor described above.

Among these raw materials, it is preferable to use the Group II raw material and the Group VI raw material.

Particularly, it is preferable to use a compound containing Zn (particularly, a carboxylate of Zn) as the Group II raw material.

Further, it is preferable to use alkylthiol as the Group VI raw material.

[Second Method of Producing Core Shell Particles]

A second method of producing a core shell particle for synthesizing the core shell particle according to the embodiment of the present invention described above (hereinafter, also referred to as the "second production method of the present invention") includes a first step of heating and stirring a solution obtained by adding a Group III raw material which contains a Group III element to a solvent containing coordination molecules; a second step of forming a core by adding a solution to which a Group V raw material containing a Group V element and silicon has been added to the solution after the first step; a third step of growing the core in the solution after the second step; a fourth step of forming a first shell by adding a raw material of the first shell to the solution after the third step; and a fifth step of forming a second shell by adding a raw material of the second shell to the solution after the fourth step and synthesizing a core shell particle, in which each of the second step to the fifth step is performed in an inert gas atmosphere, and the third step is a step of holding the state at a temperature of 200° C. or higher for longer than 2 hours.

Here, examples of the Group III element and the Group V element are the same as those described in the section of the core shell particle according to the embodiment of the present invention described above.

Hereinafter, raw materials and conditions of each treatment step will be described in detail.

[First Step]

The first step included in the second production method of the present invention is a step of heating and stirring a solution obtained by adding a Group III raw material which contains a Group III element to a solvent containing coordination molecules in the same manner as in the first step included in the first production method of the present invention.

<Coordination Molecule>

Examples of the coordination molecule used in the first step include the same coordination molecules as those used in the first step included in the first production method of the present invention.

<Solvent>

Examples of the solvent used in the first step include the same solvents as those used in the first step included in the first production method of the present invention.

<Group III Raw Material>

Examples of the Group III raw material to be added to the solvent containing the coordination molecule described above include the same Group III raw materials as those used in the first step included in the first production method of the present invention.

<Group II Raw Material>

In the production method according to the embodiment of the present invention, a Group II raw material containing a Group II element may be added together with the Group III raw material described above during the first step.

Examples of the Group II raw material containing a Group II element include the same Group II raw materials as those used in the first step included in the first production method of the present invention.

<Conditions for Heating and Stirring Solution>

In the first step, it is preferable that the coordination molecules and the Group III raw material described above are dissolved in the solvent described above and also preferable that the coordination molecules and the Group III raw material are dissolved in the solvent by heating and stirring the solution in a temperature range of 100° C. to 180° C. At this time, it is preferable that dissolved oxygen or moisture is removed from the mixed solution, in which the coordination molecules and the Group III raw material have been dissolved, by heating the solution under reduced pressure.

Further, the time required for heating and dissolving is preferably 30 minutes or longer.

In the second production method of the present invention, from the viewpoints of easily forming a uniform core in the second step described below and improving the crystallinity of the formed core, it is preferable that the first step is carried out by increasing the temperature to a range of 230° C. to 310° C. after the solution is heated and stirred.

Further, in order to reduce the influence of oxygen dissolved in the solution at the start of the second step described below, it is preferable that the step of increasing the temperature after the solution is heated and stirred is performed in an argon gas atmosphere. Further, the purity of the argon gas is preferably 99.999% by volume or greater.

[Second Step]

The second step included in the second production method of the present invention is a step of forming a core by adding a solution to which a Group V raw material containing a Group V element and silicon has been added to the solution after the first step in an inert gas atmosphere. Here, examples of the inert gas include argon gas and nitrogen gas.

<Group V Raw Material>

As the Group V raw material containing a Group V element and silicon, the same Group V raw materials as those used in the second step included in the first production method of the present invention are preferably used.

<Group II Raw Material>

According to the production method according to the embodiment of the present invention, a Group II raw material containing a Group II element may be added together with the above-described Group V raw material in the second step.

Specific examples of the Group II raw material containing a Group II element are the same as those described as the optional raw materials of the first step above.

[Third Step]

The third step included in the second production method of the present invention is a step of growing the core in the solution after the second step in an inert gas atmosphere and holding the state at a temperature of 200° C. or higher for 2 hours or longer. Here, examples of the inert gas include argon gas and nitrogen gas.

<Conditions for Growing Core>

The holding temperature in the third step is 200° C. or higher as described above, but is preferably 250° C. or higher from the viewpoints of improving the crystallinity of the particles and further reducing impurities. Further, since new nucleation of particles, excessive growth of particles, Ostwald ripening, and the like are suppressed so that the uniformity of the particle size is improved, the holding temperature is preferably 290° C. or lower.

Further, the holding time in the third step is longer than 2 hours as described above, but is preferably 150 minutes or longer and more preferably 165 minutes or longer from the viewpoints of improving the crystallinity of the particles and further reducing impurities. Further, since new nucleation of particles, excessive growth of particles, Ostwald ripening, and the like are suppressed so that the uniformity of the particle size is improved, the holding time is preferably 300 minutes or shorter.

[Fourth Step]

The fourth step included in the second production method of the present invention is a step of forming a first shell by adding a raw material of the first shell to the solution after the third step in an inert gas atmosphere in the same manner as in the first step included in the first production method of the present invention.

Here, examples of the inert gas include argon gas and nitrogen gas.

As the raw material of the first shell, the same raw materials as those used in the fourth step included in the first production method of the present invention are preferably used.

<Group VI Raw Material>

As the Group VI raw material containing a Group VI element, the same Group VI raw materials as those used in the fourth step included in the first production method of the present invention are preferably used.

[Fifth Step]

The fifth step included in the second production method of the present invention is a step of synthesizing a core shell particle by adding a raw material of a second shell to the solution after the third step in an inert gas atmosphere to form the second shell in the same manner as in the fifth step included in the first production method of the present invention.

Further, examples of the inert gas include argon gas and nitrogen gas.

As the raw material of the second shell, the same raw materials as those used in the first step included in the first production method of the present invention are preferably used.

[Film]

The film according to the embodiment of the present invention is a film containing the core shell particle according to the embodiment of the present invention described above.

Since such a film according to the embodiment of the present invention has high luminous efficacy and a narrowed emission half-width and is useful as quantum dots, the film can be applied to a wavelength conversion film used for a display, a photoelectron conversion (or wavelength conversion) film of a solar cell, a biological label, a thin film transistor, and the like. Particularly, the film according to the embodiment of the present invention is suitably applied to a down conversion film or a down shift type wavelength conversion film which absorbs light in a shorter wave region than that of the absorption edge of quantum dots and emits light having a long wave.

Further, the film material as a base material constituting the film according to the embodiment of the present invention is not particularly limited and may be a resin or a thin glass film.

Specific examples thereof include resin materials formed of an ionomer, polyethylene, polyvinyl chloride, polyvinylidene chloride, polyvinyl alcohol, polyamide, polylactic acid, polyurethane, polytetrafluoroethylene, polyacetal, polypropylene, polyester, polycarbonate, polystyrene, polyacrylonitrile, an ethylene vinyl acetate copolymer, an ethylene-vinyl alcohol copolymer, an ethylene-methacrylic acid copolymer film, an acrylic resin, or nylon.

EXAMPLES

Hereinafter, the present invention will be described in more detail based on examples. The materials, the use amounts, the ratios, the treatment contents, and the treatment procedures described in the following examples can be changed as appropriate within the range not departing from the gist of the present invention. Therefore, the scope of the present invention should not be limitatively interpreted by the following examples.

Example 1

32 mL of octadecene, 140 mg (0.48 mmol) of indium acetate, 48 mg (0.26 mmol) of zinc acetate, and 485 mg (1.89 mmol) of palmitic acid were added to a flask, heated and stirred at 110° C. in a vacuum, and degassed while the raw materials were sufficiently dissolved. Thereafter, the flask was heated to 300° C. in an argon flow, and the temperature of the solution was stabilized (first step).

Next, 0.18 mmol of tristrimethylsilylphosphine dissolved in approximately 4 mL of octadecene was added to the flask in the argon gas flow, and the state in which the solution was colored in red and particles (cores) were formed was confirmed (second step).

Thereafter, the flask was heated for 120 minutes in a state in which the temperature of the solution was held at 230° C. in the argon gas flow, and the cores were allowed to grow (third step).

Next, 30 mg (0.18 mmol) of gallium chloride and 188 µL (0.6 mmol) of oleic acid which were dissolved in 8 mL of octadecene were added to the solution in a state in which the solution was heated to 200° C. in the argon gas flow, and the solution was further heated for approximately 1 hour, thereby obtaining a dispersion liquid of a core shell particle precursor including InP (core) doped with Zn and GaP (first shell) (fourth step).

Next, the dispersion liquid was cooled to room temperature, 0.93 mmol of zinc oleate was added thereto, the dispersion liquid was heated to 240° C. in the argon gas flow, and the state thereof was held for approximately 4 hours. Next, 0.55 mL (2.3 mmol) of dodecanethiol was added to the dispersion liquid and the state of the resulting dispersion liquid was held for approximately 2 hours in the argon gas flow, thereby obtaining a dispersion liquid of a core shell particle including InP (core) doped with Zn, GaP (first shell) covering the surface of the core, and ZnS (second shell) covering the surface of the first shell (fifth step).

The obtained dispersion liquid was cooled to room temperature, and the argon gas flow was stopped. Thereafter, ethanol was added to the dispersion liquid, and centrifugation was performed on the dispersion liquid so that particles were precipitated. The supernatant was disposed of and the resultant was allowed to be dispersed in a toluene solvent. In this manner, a toluene dispersion liquid of a core shell particle including InP (core) doped with Zn, GaP (first shell) covering the surface of the core, and ZnS (second shell) covering the surface of the first shell, was obtained.

Examples 2 and 3

Samples were synthesized in the same process as in Example 1 except that the third step was performed under changed conditions as listed in Table 1 below.

Example 4

32 mL of octadecene, 140 mg (0.48 mmol) of indium acetate, 48 mg (0.26 mmol) of zinc acetate, and 485 mg (1.89 mmol) of palmitic acid were added to a flask, heated and stirred at 110° C. in a vacuum, and degassed while the raw materials were sufficiently dissolved. Thereafter, the flask was heated to 300° C. in a nitrogen gas flow, and the temperature of the solution was stabilized (first step).

Next, 0.18 mmol of tristrimethylsilylphosphine dissolved in approximately 4 mL of octadecene was added to the flask in the nitrogen gas flow, and the state in which the solution was colored in red and particles (cores) were formed was confirmed (second step).

Thereafter, the flask was heated for 150 minutes in a state in which the temperature of the solution was held at 230° C. in the nitrogen gas flow, and the cores were allowed to grow (third step).

Next, 30 mg (0.18 mmol) of gallium chloride and 188 μL (0.6 mmol) of oleic acid which were dissolved in 8 mL of octadecene were added to the solution in a state in which the solution was heated to 200° C. in the nitrogen gas flow, and the solution was further heated for approximately 1 hour, thereby obtaining a dispersion liquid of a core shell particle precursor including InP (core) doped with Zn and GaP (first shell) (fourth step).

Next, the dispersion liquid was cooled to room temperature, 0.93 mmol of zinc oleate was added thereto, the dispersion liquid was heated to 240° C. in the nitrogen gas flow, and the state thereof was held for approximately 4 hours. Next, 0.55 mL (2.3 mmol) of dodecanethiol was added to the dispersion liquid and the state of the resulting dispersion liquid was held for approximately 2 hours in the nitrogen gas flow, thereby obtaining a dispersion liquid of a core shell particle including InP (core) doped with Zn, GaP (first shell) covering the surface of the core, and ZnS (second shell) covering the surface of the first shell (fifth step).

The obtained dispersion liquid was cooled to room temperature, and the nitrogen gas flow was stopped. Thereafter, ethanol was added to the dispersion liquid, and centrifugation was performed on the dispersion liquid so that particles were precipitated. The supernatant was disposed of and the resultant was allowed to be dispersed in a toluene solvent. In this manner, a toluene dispersion liquid of a core shell particle including InP (core) doped with Zn, GaP (first shell) covering the surface of the core, and ZnS (second shell) covering the surface of the first shell, was obtained.

Examples 5 to 7

Samples were synthesized in the same process as in Example 4 except that the third step was performed under changed conditions as listed in Table 1 below.

Comparative Example 1

32 mL of octadecene, 140 mg (0.48 mmol) of indium acetate, 48 mg (0.26 mmol) of zinc acetate, and 364 mg (1.44 mmol) of palmitic acid were added to a flask, heated and stirred at 110° C. in a vacuum, and degassed while the raw materials were sufficiently dissolved. Thereafter, the flask was heated to 300° C. in a nitrogen gas flow, and the temperature of the solution was stabilized (first step).

Next, 0.24 mmol of tristrimethylsilylphosphine dissolved in approximately 4 mL of octadecene was added to the flask in the nitrogen gas flow, and the state in which the solution was colored in red and particles (cores) were formed was confirmed (second step).

Thereafter, the flask was heated for 120 minutes in a state in which the temperature of the solution was held at 230° C. in the nitrogen gas flow, and the cores were allowed to grow in the same manner as in "Highly Luminescent InP/GaP/ZnS Nanocrystals and Their Application to White Light-Emitting Diodes", Journal of the American Chemical Society 134, written by S. Kim et al., 3804-3809 (2012) (third step).

Next, 20 mg (0.12 mmol) of gallium chloride and 125 μL (0.4 mmol) of oleic acid which were dissolved in 8 mL of octadecene were added to the solution in a state in which the solution was heated to 200° C. in the nitrogen gas flow, and the solution was further heated for approximately 1 hour, thereby obtaining a dispersion liquid of a core shell particle precursor including InP (core) doped with Zn and GaP (first shell) (fourth step).

Next, the dispersion liquid was cooled to room temperature, 220 mg (1.2 mmol) of zinc acetate was added thereto, the dispersion liquid was heated to 230° C., and the state thereof was held for approximately 4 hours. Next, 479 μL (2.0 mmol) of dodecanethiol was added to the dispersion liquid and the state of the resulting dispersion liquid was held at 230° C. for approximately 2 hours in the nitrogen gas flow, thereby obtaining a dispersion liquid of a core shell particle including InP (core) doped with Zn, GaP (first shell) covering the surface of the core, and ZnS (second shell) covering the surface of the first shell (fifth step).

The obtained dispersion liquid was cooled to room temperature, and the nitrogen gas flow was stopped. Thereafter, ethanol was added to the dispersion liquid, and centrifugation was performed on the dispersion liquid so that particles were precipitated. The supernatant was disposed of and the resultant was allowed to be dispersed in a toluene solvent. In this manner, a toluene dispersion liquid of a core shell particle including InP (core) doped with Zn, GaP (first shell) covering the surface of the core, and ZnS (second shell) covering the surface of the first shell, was obtained.

Comparative Examples 2 and 3

Samples were synthesized in the same process as in Example 4 except that the third step was performed under changed conditions as listed in Table 1 below.

<Molar Ratio (Silicon/Group III Element)>

With the obtained core shell particles, the molar ratio [molar ratio (silicon/Group III element)] of silicon contained in the entirety of the core shell particles to the Group III element contained in the core was acquired by XPS. The details of the method of acquiring the molar ratio (silicon/Group III element) are as described above. The results are listed in Table 1 below.

<Silicon Content Ratio>

With the obtained core shell particles, the proportion (silicon content ratio) of silicon elements with respect to the following measurement elements measured by the XPS analysis under the above-described conditions was acquired. The details of the method of acquiring the silicon content ratio are as described above. The results are listed in Table 1 below.

Measurement elements (measurement trajectory): C (1s), N (1s), O (1s), Si (2p), P (2p), S (2p), Cl (2p), Zn (2p3/2), Ga (2p3/2), In (3d5/2)

<Luminous Efficacy>

The emission intensity was measured by adjusting the concentration of the obtained dispersion liquid of the core shell particles such that the absorbance at an excitation wavelength of 450 nm was set to 0.04 using an absolute PL quantum yield measuring device C11347 (manufactured by Hamamatsu Photonics K.K.). Further, the luminous efficacy was calculated by performing relative comparison with a quantum dot sample whose luminous efficacy was known. The obtained luminous efficacy was calculated as a ratio of the number of emission photons to the number of absorption photons from excitation light. The results are listed in Table 1 below.

<Emission Half-Width>

With the obtained dispersion liquid of the core shell particles, the fluorescence spectrum was measured at room temperature using light having an excitation wavelength of 450 nm to acquire the half-width. Specifically, each wavelength which becomes half of the peak intensity of the fluorescence spectrum to be observed was acquired, and the emission half-width was acquired from the difference in wavelength. The results are listed in Table 1 below.

TABLE 1

| | | Third step | | Molar ratio | Silicon | | |
|---|---|---|---|---|---|---|---|
| | Type of flow gas | Holding temperature (° C.) | Holding time (min) | (silicon/ Group III element) | content ratio (%) | Luminous efficacy (%) | Emission half-width (nm) |
| Example 1 | Argon | 230 | 120 | 0.9 | 1.2 | 80.1 | 42 |
| Example 2 | Argon | 190 | 150 | 1.5 | 1.9 | 77.6 | 47 |
| Example 3 | Argon | 230 | 150 | 0.8 | 1.1 | 81.2 | 41 |
| Example 4 | Nitrogen | 230 | 150 | 1.4 | 1.8 | 78.4 | 48 |
| Example 5 | Nitrogen | 230 | 165 | 1.0 | 1.3 | 79.8 | 43 |
| Example 6 | Nitrogen | 250 | 150 | 1.1 | 1.4 | 78.7 | 43 |
| Example 7 | Nitrogen | 210 | 130 | 2.5 | 3.2 | 75.4 | 50 |
| Example 8 | Nitrogen | 290 | 150 | 1.3 | 1.4 | 76.3 | 49 |
| Example 9 | Nitrogen | 230 | 300 | 1.3 | 1.5 | 77.3 | 49 |
| Comparative Example 1 | Nitrogen | 230 | 120 | 3.3 | 4.3 | 53.0 | 78 |
| Comparative Example 2 | Nitrogen | 190 | 150 | 3.2 | 4.2 | 75.2 | 58 |
| Comparative Example 3 | Nitrogen | 230 | 100 | 3.3 | 4.1 | 76.2 | 56 |

Based on the results listed in Table 1, it was found that the luminous efficacy was decreased and the emission half-width was widened in a case of the core shell particles having a molar ratio (silicon/Group III element) of greater than 3.1 (Comparative Examples 1 and 3).

Specifically, it was found that, in a case where the holding time for the third step was 2 hours or shorter, similarly, the molar ratio (silicon/Group III element) was greater than 3.1, the luminous efficacy was decreased, and the emission half-width was widened (Comparative Examples 1 and 3).

Further, it was found that, in a case where the holding temperature for the third step was 200° C. or lower, the molar ratio (silicon/Group III element) was greater than 3.1, the luminous efficacy was decreased, and the emission half-width was widened (Comparative Example 2).

On the contrary, it was found that the luminous efficacy was increased and the emission half-width was narrowed in a case of the core shell particles having a molar ratio (silicon/Group III element) of 3.1 or less and containing cores, the first shells, the second shells, and the coordination molecules (Examples 1 to 9).

Particularly, based on the comparison between Examples 4 to 7, it was found that the luminous efficacy was more increased and the emission half-width was more narrowed in a case where the molar ratio (silicon/Group III element) was 1.6 or less, and the luminous efficacy was still more increased and the emission half-width was still more narrowed in a case where the molar ratio (silicon/Group III element) was 1.2 or less.

What is claimed is:

1. A core shell particle comprising:
    a core which contains a Group III element and a Group V element;
    a first shell which covers at least a part of a surface of the core;
    a second shell which covers at least a part of the first shell; and
    a coordination molecule in at least a part of an outermost surface,
    wherein at least silicon is detected by X-ray photoelectron spectroscopy analysis, and
    a molar ratio of the silicon to the Group III element contained in the core, which is acquired by X-ray photoelectron spectroscopy analysis, is 3.1 or less.

2. The core shell particle according to claim 1,
    wherein the molar ratio of the silicon to the Group III element contained in the core, which is acquired by X-ray photoelectron spectroscopy analysis, is 1.6 or less.

3. The core shell particle according to claim 1,
    wherein the molar ratio of the silicon to the Group III element contained in the core, which is acquired by X-ray photoelectron spectroscopy analysis, is 1.2 or less.

4. The core shell particle according to claim 1,
    wherein the Group III element contained in the core is In, and
    the Group V element contained in the core is any of P, N, or As.

5. The core shell particle according to claim 4,
    wherein the Group III element contained in the core is In, and
    the Group V element contained in the core is P.

6. The core shell particle according to claim 1,
    wherein the core further contains a Group II element.

7. The core shell particle according to claim 6,
    wherein the Group II element contained in the core is Zn.

8. The core shell particle according to claim 1,
wherein the first shell contains a Group II element or a Group III element,
wherein, in a case where the first shell contains the Group III element, the Group III element contained in the first shell is a Group III element which is different from the Group III element contained in the core.

9. The core shell particle according to claim 1,
wherein the first shell is a Group II-VI semiconductor which contains a Group II element and a Group VI element or a Group III-V semiconductor which contains a Group III element and a Group V element,
wherein, in a case where the first shell is the Group III-V semiconductor, the Group III element contained in the Group III-V semiconductor is a Group III element which is different from the Group III element contained in the core.

10. The core shell particle according to claim 9,
wherein, in a case where the first shell is the Group II-VI semiconductor, the Group II element is Zn and the Group VI element is Se or S, and
in a case where the first shell is the Group III-V semiconductor, the Group III element is Ga and the Group V element is P.

11. The core shell particle according to claim 9,
wherein the first shell is the Group III-V semiconductor, the Group III element is Ga, and the Group V element is P.

12. The core shell particle according to claim 1,
wherein the second shell is a Group II-VI semiconductor which contains a Group II element and a Group VI element or a Group III-V semiconductor which contains a Group III element and a Group V element.

13. The core shell particle according to claim 12,
wherein the second shell is the Group II-VI semiconductor,
the Group II element is Zn, and
the Group VI element is S.

14. The core shell particle according to claim 1,
wherein the core, the first shell, and the second shell each have a crystal system having a zinc blende structure.

15. The core shell particle according to claim 1,
wherein, among the core, the first shell, and the second shell, a band gap of the core is the smallest, and the core and the first shell respectively have a type 1 band structure.

16. A method of producing a core shell particle for synthesizing the core shell particle according to claim 1, the method comprising:
a first step of heating and stirring a solution obtained by adding a Group III raw material which contains a Group III element to a solvent containing coordination molecules;
a second step of forming a core by adding a solution to which a Group V raw material containing a Group V element and silicon has been added to the solution after the first step;
a third step of growing the core in the solution after the second step;
a fourth step of forming a first shell by adding a raw material of the first shell to the solution after the third step; and
a fifth step of forming a second shell by adding a raw material of the second shell to the solution after the fourth step and synthesizing a core shell particle,
wherein the second step is performed in an argon gas atmosphere, the third step, the fourth step, and the fifth step are performed in an inert gas atmosphere, and the third step is a step of holding the state at a temperature of 150° C. or higher for 30 minutes or longer.

17. A method of producing a core shell particle for synthesizing the core shell particle according to claim 1, the method comprising:
a first step of heating and stirring a solution obtained by adding a Group III raw material which contains a Group III element to a solvent containing coordination molecules;
a second step of forming a core by adding a solution to which a Group V raw material containing a Group V element and silicon has been added to the solution after the first step;
a third step of growing the core in the solution after the second step;
a fourth step of forming a first shell by adding a raw material of the first shell to the solution after the third step; and
a fifth step of forming a second shell by adding a raw material of the second shell to the solution after the fourth step and synthesizing a core shell particle,
wherein each of the second step to the fifth step is performed in an inert gas atmosphere, and the third step is a step of holding the state at a temperature of 200° C. or higher for longer than 2 hours.

18. The method of producing a core shell particle according to claim 17,
wherein the holding time in the third step is 150 minutes or longer.

19. The method of producing a core shell particle according to claim 17,
wherein the holding time in the third step is 165 minutes or longer.

20. The method of producing a core shell particle according to claim 17,
wherein the holding time in the third step is 300 minutes or shorter.

21. The method of producing a core shell particle according to claim 17,
wherein the holding temperature in the third step is 250° C. or higher.

22. The method of producing a core shell particle according to claim 17,
wherein the holding temperature in the third step is 290° C. or lower.

23. A film comprising:
the core shell particle according to claim 1.

* * * * *